(12) United States Patent
Lee et al.

(10) Patent No.: US 11,252,605 B2
(45) Date of Patent: Feb. 15, 2022

(54) METHOD AND DEVICE FOR TRANSMITTING DATA UNIT

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 16/349,964

(22) PCT Filed: Jan. 18, 2018

(86) PCT No.: PCT/KR2018/000838
§ 371 (c)(1),
(2) Date: May 14, 2019

(87) PCT Pub. No.: WO2018/135874
PCT Pub. Date: Jul. 26, 2018

(65) Prior Publication Data
US 2019/0335361 A1    Oct. 31, 2019

Related U.S. Application Data

(60) Provisional application No. 62/447,926, filed on Jan. 19, 2017.

(51) Int. Cl.
*H04W 28/06* (2009.01)
*H04W 80/02* (2009.01)

(52) U.S. Cl.
CPC ......... *H04W 28/065* (2013.01); *H04W 28/06* (2013.01); *H04W 80/02* (2013.01)

(58) Field of Classification Search
CPC .... H04W 28/065; H04W 80/02; H04W 28/06
See application file for complete search history.

(56) References Cited

U.S. PATENT DOCUMENTS

| | | |
|---|---|---|
| 9,713,104 B2 * | 7/2017 | Zhao ................... H04L 5/0007 |
| 2009/0163211 A1 | 6/2009 | Kitazoe et al. |
| 2011/0096725 A1 | 4/2011 | Chun et al. |
| 2012/0113811 A1 | 5/2012 | Bao et al. |
| 2013/0100925 A1 | 4/2013 | Ahn et al. |
| 2014/0341013 A1 | 11/2014 | Kumar et al. |
| 2018/0103395 A1 * | 4/2018 | Gholmieh ............ H04W 28/04 |
| 2018/0146398 A1 * | 5/2018 | Kim ..................... H04W 80/02 |
| 2019/0052736 A1 * | 2/2019 | Turtinen ................ H04L 69/03 |
| 2019/0230667 A1 * | 7/2019 | Loehr .................. H04L 1/0078 |

OTHER PUBLICATIONS

PCT International Application No. PCT/KR2018/000838, Notification of Transmittal of The International Search Report and the Written Opinion of the International Searching Authority, or Declaration dated Apr. 23, 2018, 17 pages.

* cited by examiner

*Primary Examiner* — Jae Y Lee
*Assistant Examiner* — Aixa A Guadalupe Cruz
(74) *Attorney, Agent, or Firm* — Lee Hong Degerman Kang Waimey

(57) ABSTRACT

A transmitting device generates a medium access control (MAC) protocol data unit (PDU). The transmitting device transmits the MAC PDU. The MAC PDU includes a MAC control element (CE) start indicator. The MAC CE start indicator indicates the start point of the first MAC CE in the MAC PDU.

18 Claims, 14 Drawing Sheets

(a) Control-Plane Protocol Stack (b) User-Plane Protocol Stack

R/F2/E/LCID/F/L sub-header with 7-bits L field

R/F2/E/LCID/F/L sub-header with 15-bits L field (a)

R/F2/E/LCID/L sub-header with 16-bits L field (b)

R/F2/E/LCID sub-header (c)

METHOD AND DEVICE FOR TRANSMITTING DATA UNIT

CROSS-REFERENCE TO RELATED APPLICATIONS

This application is the National Stage filing under 35 U.S.C. 371 of International Application No. PCT/KR2018/000838, filed on Jan. 18, 2018, which claims the benefit of U.S. Provisional Application No. 62/447,926, filed on Jan. 19, 2017, the contents of which are hereby incorporated by reference herein in its entirety.

TECHNICAL FIELD

The present invention relates to a wireless communication system, and more particularly, to a method for transmitting a data unit and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method of transmitting, by a transmitting device, a data unit in a wireless communication system. The method comprises: generating, by the transmitting device, a medium access control (MAC) protocol data unit (PDU); and transmitting, by the transmitting device, the MAC PDU. The MAC PDU includes a MAC control element (CE) start indicator. The MAC CE start indicator indicates the start point of the first MAC CE in the MAC PDU.

In another aspect of the present invention, provided herein is a transmitting device for transmitting a data unit in a wireless communication system. The transmitting device comprises: a radio frequency (RF) unit, and a processor configured to control the RF unit. The processor may be configured to: generate a medium access control (MAC) protocol data unit (PDU); and control the RF unit to transmit the MAC PDU. The MAC PDU includes a MAC control element (CE) start indicator. The MAC CE start indicator indicates the start point of the first MAC CE in the MAC PDU.

In each aspect of the present invention, the MAC PDU may always include the MAC CE start indicator even if there is no MAC CE included in the MAC PDU.

In each aspect of the present invention, the MAC PDU may include zero or more MAC service data units (SDUs) and zero or more MAC CEs.

In each aspect of the present invention, the MAC CE start indicator may indicate the start point by indicating a sum of a total length of the MAC CEs included in the MAC PDU and a total length of respective MAC subheaders for the MAC CEs included in the MAC PDU.

In each aspect of the present invention, the MAC CE start indicator may indicate the start point by indicating a sum of a total length of the MAC CEs included in the MAC PDU, a total length of respective MAC subheaders for the MAC CEs included in the MAC PDU, a length of padding bits included in the MAC PDU, and a length of a MAC subheader for the padding bits included in the MAC PDU.

In each aspect of the present invention, the MAC CE start indicator may indicate the start point by indicating a sum of a total length of the MAC SDUs included in the MAC PDU and a total length of respective MAC subheaders for the MAC SDUs included in the MAC PDU In each aspect of the present invention, the MAC CE start indicator may indicate the start point by indicating a sum of a total length of the MAC SDUs included in the MAC PDU, a total length of respective MAC subheaders for the MAC SDUs included in the MAC PDU, a length of padding bits included in the MAC PDU, and a length of a MAC subheader for the padding bits included in the MAC PDU.

In each aspect of the present invention, the zero or more MAC SDUs may be placed before the zero or more MAC CEs in the MAC PDU.

In each aspect of the present invention, the MAC CE start indicator may be placed in the beginning or end of the MAC PDU.

In each aspect of the present invention, the MAC PDU may include no MAC subheader for the MAC CE start indicator.

In each aspect of the present invention, the transmitting or receiving device is an autonomous vehicle that communicates with at least a mobile terminal, a network, and another autonomous vehicle other than the device. The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduced.

According to the present invention, a transmitting side can process medium access control (MAC) service data units (SDUs) for transmission without waiting for the MAC control element (CE) construction, thereby facilitating the fast MAC PDU processing in the transmitting side.

According to the present invention, a receiving side can easily identify a MAC CE in a MAC protocol data unit (PDU), and this will facilitate the fast MAC CE processing in the receiving side.

Also, signals in a new radio access technology system can be transmitted/received effectively.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
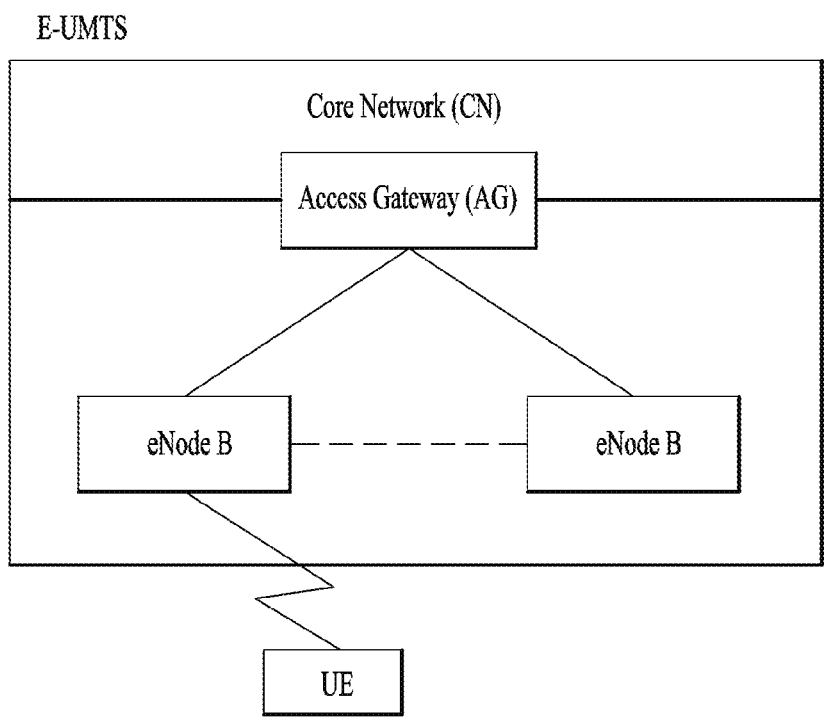
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB. For convenience of description, in describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "PDCCH" refers to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, monitoring a channel implies attempting to decode the channel. For example, monitoring a PDCCH implies attempting to decode PDCCH(s) (or PDCCH candidates).

In the present invention, for dual connectivity operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331, and 3GPP NR standard documents, for example, 38.xxx series may be referenced.

Figure 2:
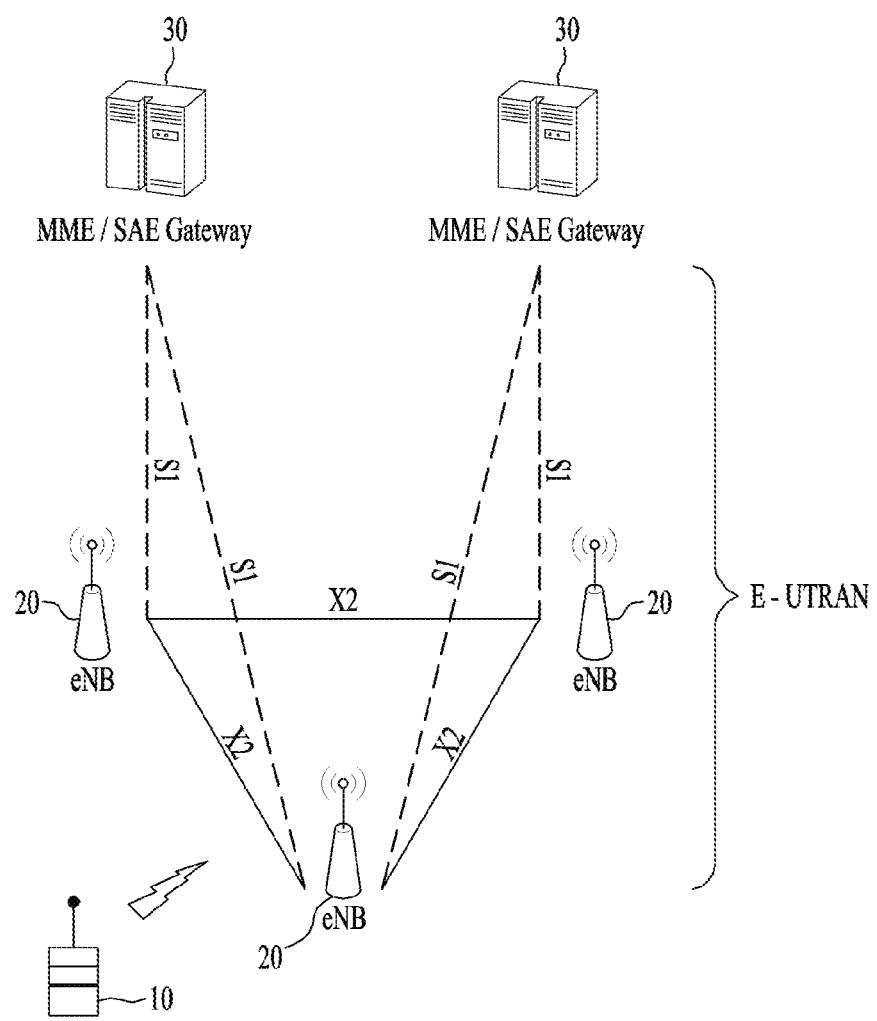
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
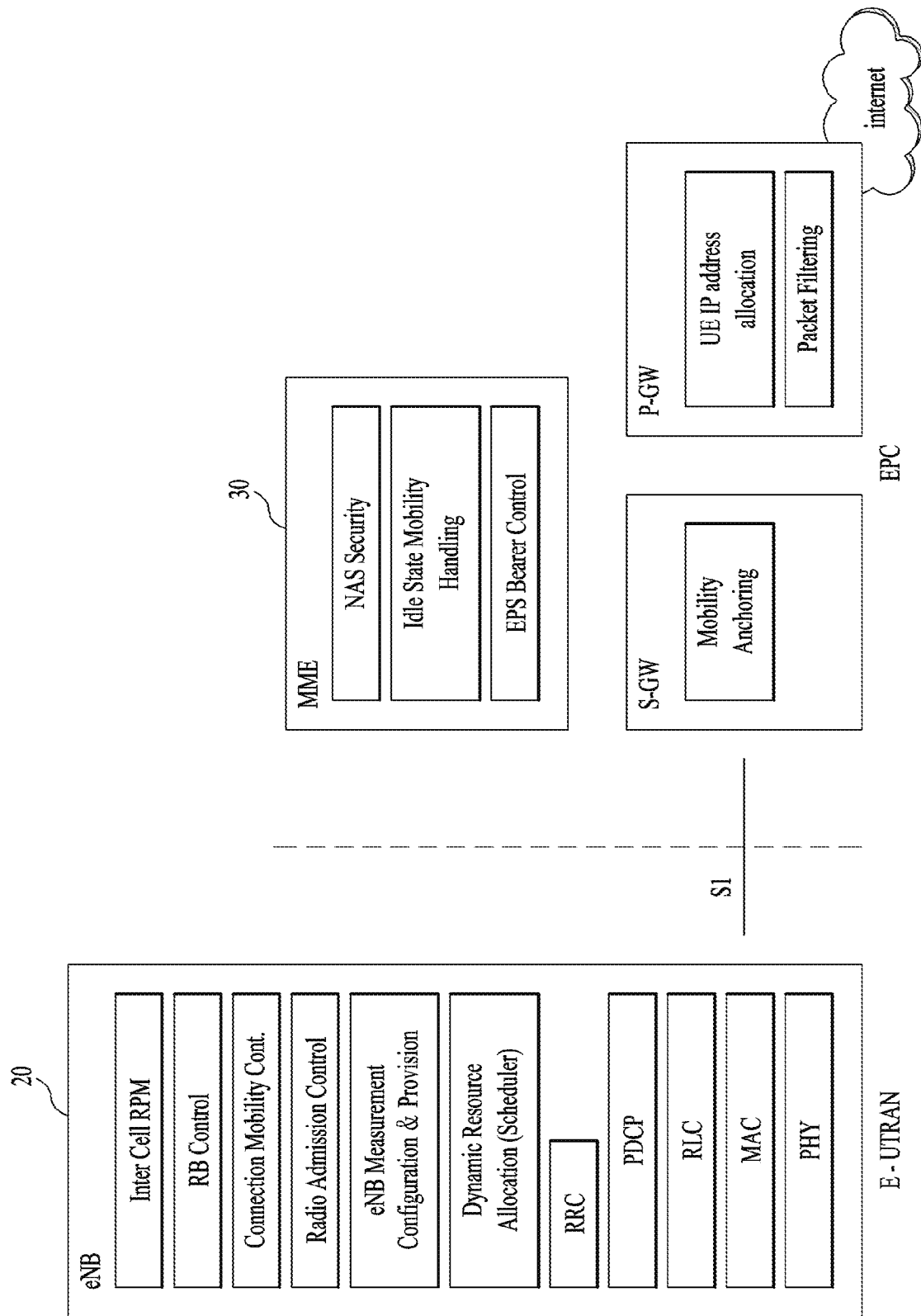
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
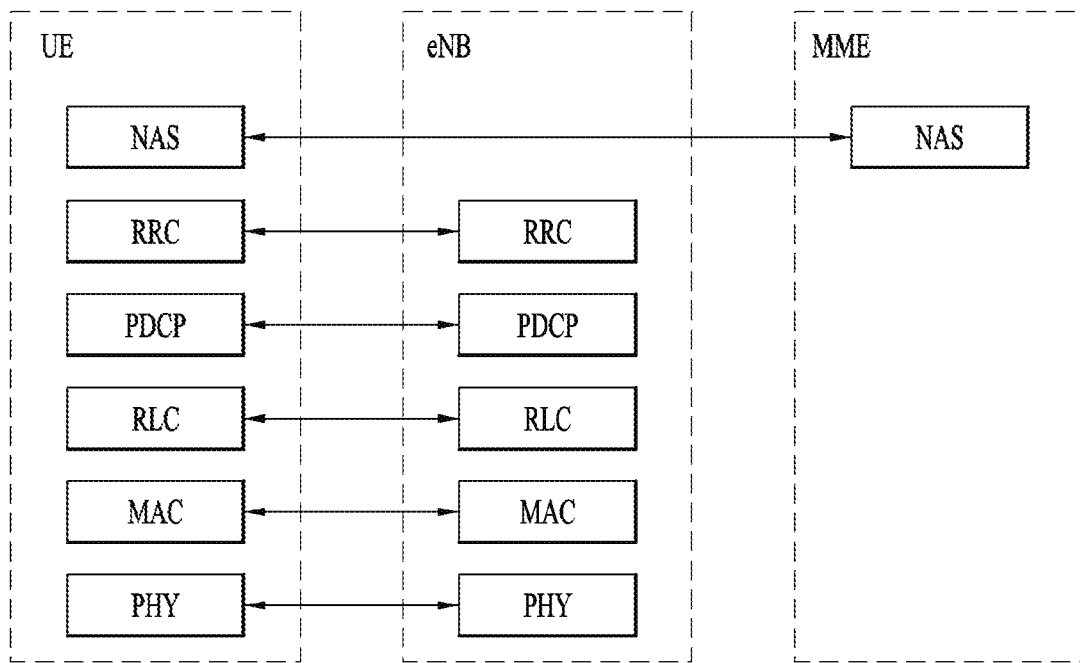
FIG. 4 is a diagram showing a control plane and a user plane of a radio interface protocol between a UE and an E-UTRAN based on a 3GPP radio access network standard.
Figure 4:
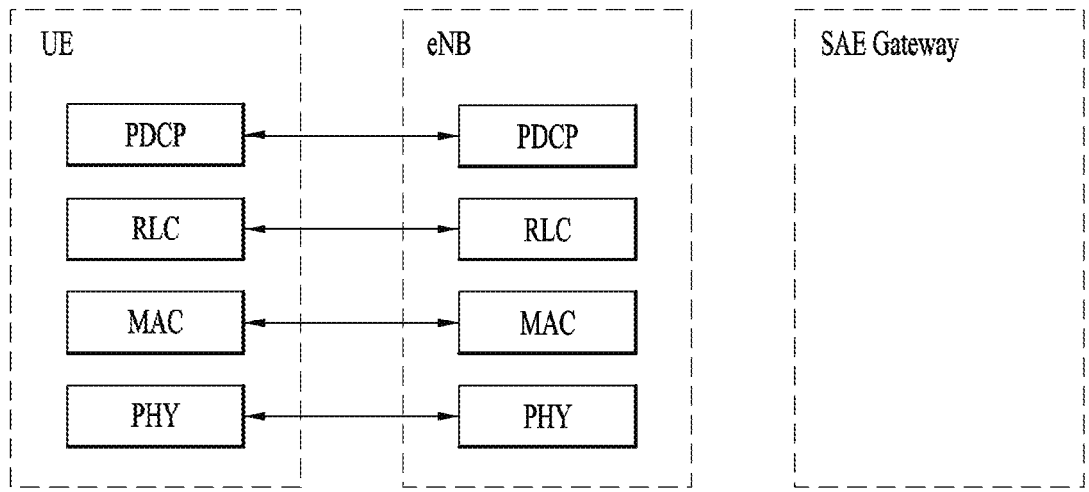

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

Radio bearers are roughly classified into (user) data radio bearers (DRBs) and signaling radio bearers (SRBs). SRBs are defined as radio bearers (RBs) that are used only for the transmission of RRC and NAS messages.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
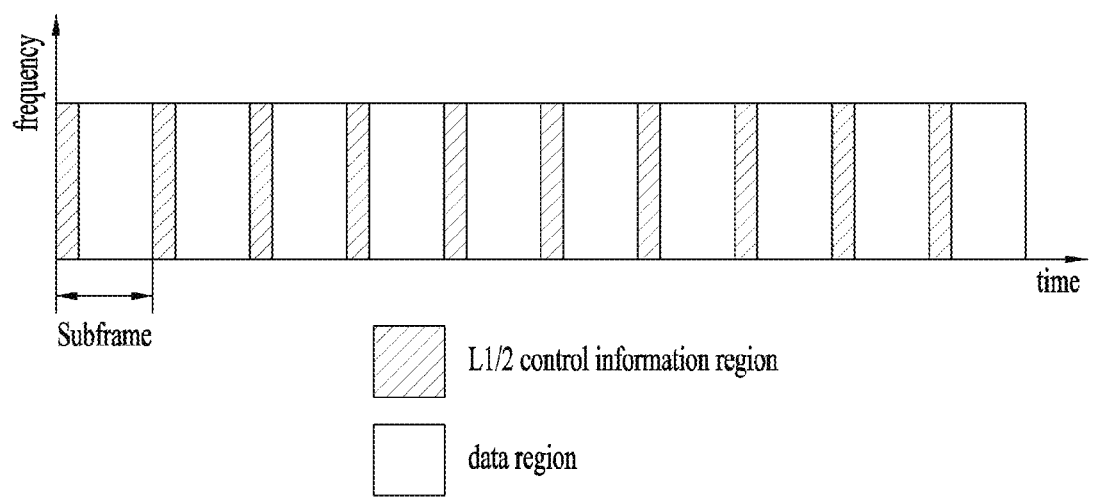
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, an opportunity of transmission of an UL grant or a DL grant is present every 1 ms, and the UL/DL grant opportunity does not exists several times in less than 1 ms. Therefore, the TTI in the legacy LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information. In the present invention, a PDCCH addressed to a certain RNTI means that the PDCCH is CRC-masked with the certain RNTI. A UE may attempt to decode a PDCCH using the certain RNTI if the UE is monitoring a PDCCH addressed to the certain RNTI.

Figure 6:
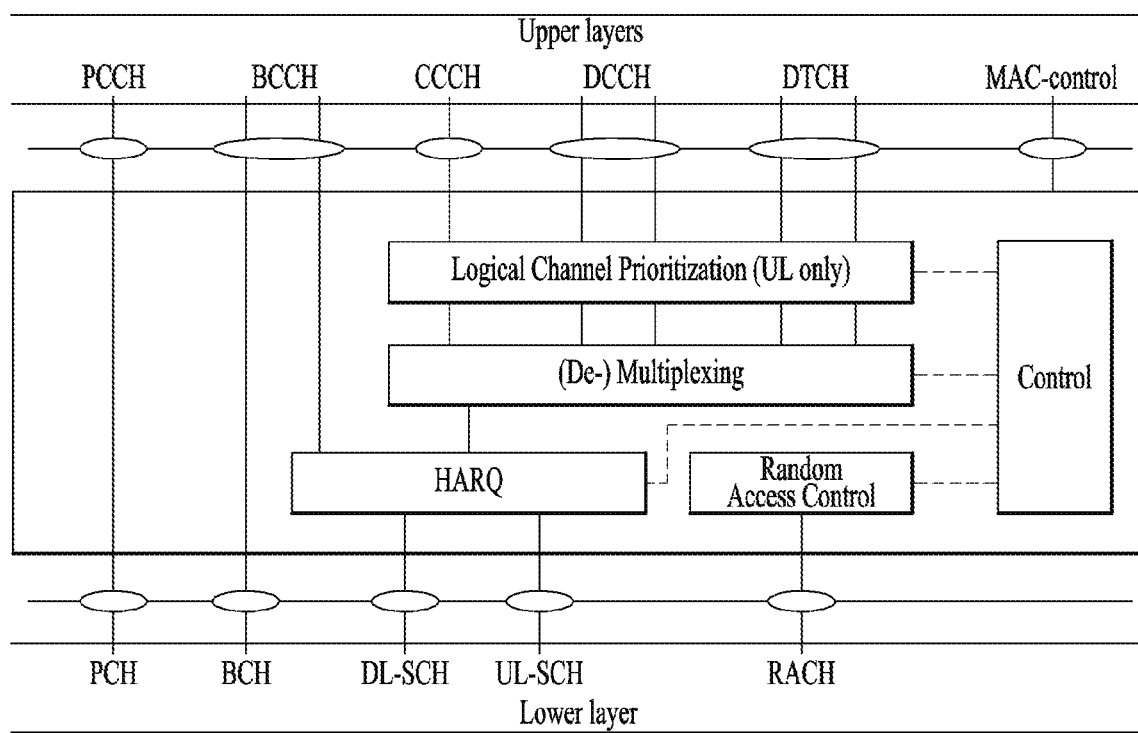
FIG. 6 is a diagram for medium access control (MAC) structure overview in a UE side.

FIG. 6 is a diagram for medium access control (MAC) structure overview in a UE side.

The MAC layer supports the following functions: mapping between logical channels and transport channels; multiplexing of MAC SDUs from one or different logical channels onto transport blocks (TB) to be delivered to the physical layer on transport channels; demultiplexing of MAC SDUs from one or different logical channels from transport blocks (TB) delivered from the physical layer on transport channels; scheduling information reporting (e.g. scheduling request, buffer status reporting); error correction through HARQ; priority handling between UEs by means of dynamic scheduling; priority handling between logical channels of one MAC entity; Logical Channel Prioritization (LCP); transport format selection; and radio resource selection for sidelink (SL).

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical channel types specified for LTE includes broadcast control channel (BCCH), paging control channel (PCCH), common control channel (CCCH), dedicated control channel (DCCH), multicast control channel (MCCH), dedicated traffic channel (DTCH), multicast traffic channel (MTCH).

From the physical layer, the MAC layer uses services in the form of transport channels. A transport channel is defined by how and with what characteristics the information is transmitted over the radio interface. Data on a transport channel is organized into transport blocks. In each transmission time interval (TTI), at most one transport block of dynamic size is transmitted over the radio interface to/from a terminal in the absence of spatial multiplexing. In the case of spatial multiplexing (MIMO), there can be up to two transport blocks per TTI.

Associated with each transport block is a transport format (TF), specifying how the transport block is to be transmitted over the radio interface. The transport format includes information about the transport-block size, the modulation-and-coding scheme, and the antenna mapping. By varying the transport format, the MAC layer can thus realize different data rates. Rate control is therefore also known as transport-format selection.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information.

Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

Figure 7:
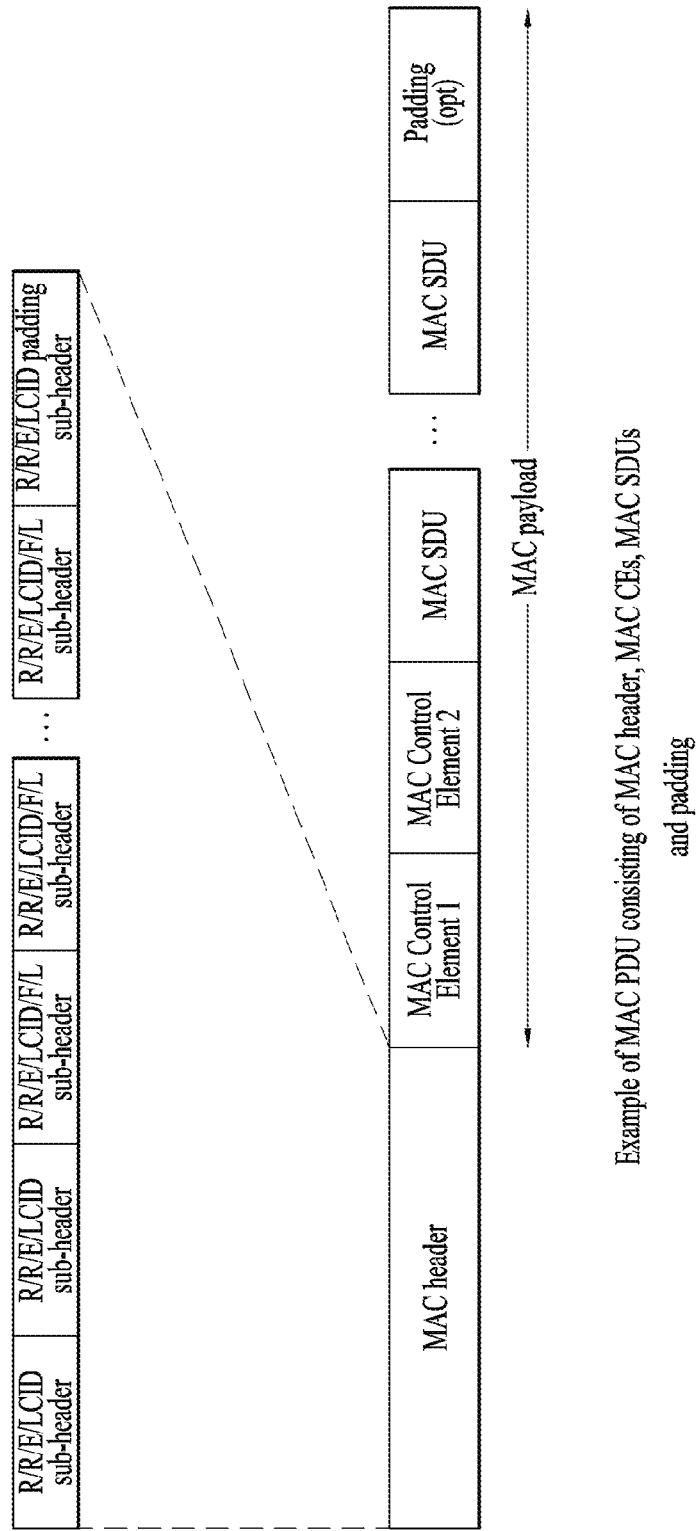
FIG. 7 is a diagram for a MAC PDU structure used in the LTE/LTE-A system.
Figure 8:
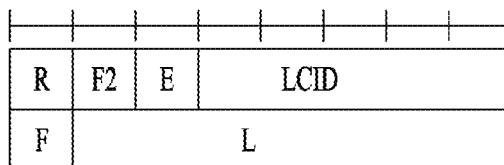
FIG. 8 are examples of MAC subheaders used in the LTE/LTE-A system.
Figure 8:
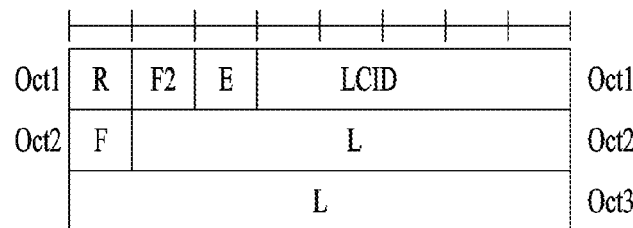
Figure 8:
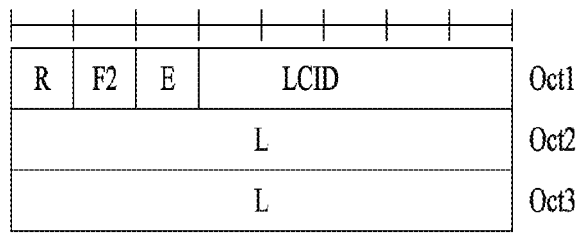
Figure 8:
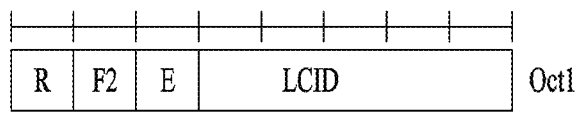

FIG. 7 is a diagram for a MAC PDU structure used in the LTE/LTE-A system. FIG. 8 are examples of MAC subheaders used in the LTE/LTE-A system.

A MAC PDU is a bit string that is byte aligned (i.e. multiple of 8 bits) in length. In FIG. 8, bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU is represented with the first and most significant bit in the leftmost bit and the last and least significant bit in the rightmost bit.

MAC SDUs are bit strings that are byte aligned (i.e. multiple of 8 bits) in length. An SDU is included into a MAC PDU from the first bit onward. The MAC entity shall ignore the value of reserved bits in downlink MAC PDUs.

A MAC PDU consists of a MAC header, zero or more MAC service data units (MAC SDUs), zero or more MAC control elements (MAC CEs), and optionally padding, as described in FIG. 7. Both the MAC header and the MAC SDUs are of variable sizes.

A MAC PDU header consists of one or more MAC PDU subheaders; each subheader corresponds to either a MAC SDU, a MAC control element or padding. Referring to FIG. 8, a MAC PDU subheader consists of the five or six header fields R/F2/E/LCID/(F)/L but for the last subheader in the MAC PDU and for fixed sized MAC control elements. The last subheader in the MAC PDU and subheaders for fixed sized MAC control elements consist solely of the four header fields R/F2/E/LCID. A MAC PDU subheader corresponding to padding consists of the four header fields R/F2/E/LCID.

In the LTE/LTE-A system, MAC PDU subheaders have the same order as the corresponding MAC SDUs, MAC control elements and padding. In the LTE/LTE-A system, MAC control elements are always placed before any MAC SDU.

Padding occurs at the end of the MAC PDU, except when single-byte or two-byte padding is required. Padding may have any value and the MAC entity shall ignore it. When padding is performed at the end of the MAC PDU, zero or more padding bytes are allowed. In the LTE/LTE-A system, when single-byte or two-byte padding is required, one or two MAC PDU subheaders corresponding to padding are placed at the beginning of the MAC PDU before any other MAC PDU subheader. A maximum of one MAC PDU can be transmitted per TB per MAC entity. A maximum of one MCH MAC PDU can be transmitted per TTI.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Work has started in ITU and 3GPP to develop requirements and specifications for new radio systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for the new RAT (NR) System (also referred to as 5G new RAT). It is required to identify and develop the technology components needed for successfully standardizing the NR system timely satisfying both the urgent market needs, and the more long-term requirements set forth by the ITU-R IMT-2020 process. In order to achieve this, evolutions of the radio interface as well as radio network architecture have to be considered in the "New Radio Access Technology."

Figure 9:
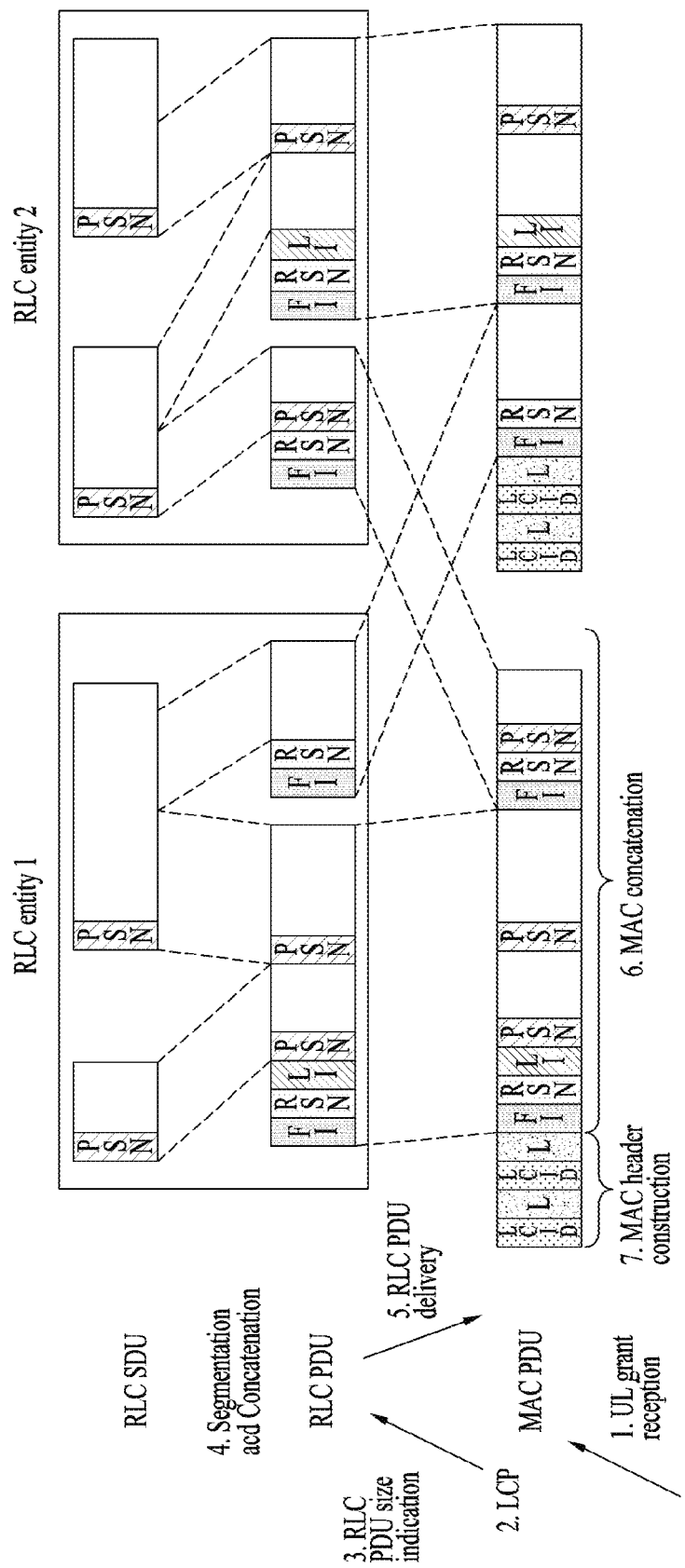
FIG. 9 illustrates an overall procedure of the MAC PDU construction process in the LTE/LTE-A system.

FIG. 9 illustrates an overall procedure of the MAC PDU construction process in the LTE/LTE-A system.

In the LTE/LTE-A system, a MAC PDU construction process at a UE starts when a UL grant is received, as follows.

>1. The UE receives a UL grant from an eNB.

>2. The MAC entity performs Logical Channel Prioritization (LCP) procedure to determine the RLC PDU size for each RLC entity.

>3. The MAC entity indicates the determined RLC PDU size to each RLC entity.

>4. Each RLC entity performs segmentation and/or concatenation of RLC SDUs to construct a RLC PDU. For each RLC PDU, Framing Info (FI) and RLC Sequence Number (RSN) are mandatorily present. The Length Indicator (LI) is included each time two RLC SDUs (segments) are concatenated.

>5. Each RLC entity delivers the constructed RLC PDU to the MAC entity.

>6. The MAC entity concatenates RLC PDUs received from multiple RLC entities.

>7. The MAC entity sets the value of MAC subheader for each MAC SDU, and collects all MAC subheaders in front of the MAC PDU to form a MAC header.

The MAC PDU construction process in the LTE/LTE-A system has the following problems and/or redundancies. A UE can start the MAC PDU construction process only after the UE receives a UL grant. Especially, RLC segmentation and concatenation process starts only after the MAC entity indicates the RLC PDU size to the RLC entity, which takes long time before MAC PDU construction. Due to the variable length nature of MAC SDU and MAC subheaders, determining a RLC PDU size for each RLC entity is very complex. In the meantime, in the LTE/LTE-A system, a PDCP SN is already included in a RLC SDU, and adding another SN in the RLC is redundant. The same function is spread over two layers (MAC and RLC), which is redundant and inefficient, since the RLC includes a LI field to indicate the length of RLC SDU (segment), and the MAC includes a L field to indicate the length of MAC SDU.

Besides, in the LTE/LTE-A system, MAC control elements are always placed before any MAC SDU. A MAC PDU cannot be delivered to the PHY until whole the MAC PDU is constructed, because all the MAC subheaders should be collected together and put into the front of the MAC PDU.

During the 3GPP meetings for the NR system, with a purpose of enabling fast delivery of MAC PDU to PHY layer, it was agreed that MAC sub-headers are interleaved with MAC SDUs such that a MAC subheader is placed before its corresponding MAC SDU or MAC CE. With interleaved MAC sub-header, it is expected that MAC can deliver the generated part of MAC PDU immediately after attaching a MAC subheader to a corresponding generated MAC SDU or MAC CE, even before generating whole MAC PDU, so that the PHY can start processing of the received part of MAC PDU quickly.

For the same purpose of enabling fast delivery of MAC PDU to PHY layer, it was proposed not to allow place MAC CEs in the middle of the MAC PDU. In a UE, some MAC CEs such as BSR or PHR need to reflect the latest UE status before transmission. For example, BSR MAC CE is placed at the beginning of MAC PDU as in the LTE/LTE-A system, the MAC at the UE can only deliver the MAC PDU after a complete MAC PDU is generated, because a BSR MAC can only be generated after placing all MAC SDUs, and the PHY needs to receive MAC PDU in order, i.e., from the beginning part, for the PHY layer processing. Placing the MAC CE at the end of a MAC PDU enables partial MAC PDU delivery to physical layer while gives more time to reflect the latest UE status in the MAC CE. In the receiving side, the placement of MAC CEs does not affect receiving process as the receiving process would start only after receiving a whole transport block. In the receiving side, especially if the receiving side is a scheduler, what is important is how fast the receiver identifies the placement of MAC CEs. It is because the receiving side could identify MAC CEs at the end of the MAD PDU even before receiving a whole transport block and perform scheduling fast based on the MAC CEs if the MAC CEs are not placed in the middle of the MAC PDU but placed at the end of the MAC CE. However, there are following problems at this proposal.

With the interleaved MAC subheader, which is placed before its corresponding MAC SDU or MAC CE, decoding of the MAC CEs which is placed at the end of MAC PDU is impossible because the receiving side doesn't know how many MAC SDUs are placed in front of MAC CE, i.e., the starting point of MAC CE within the MAC PDU. In other words, if a MAC subheader is attached at the beginning of a corresponding MAC SDU or MAC CE, the BS has to process all MAC SDU(s) before identifying the MAC CE(s). This burden is definitely not preferred in the BS side. Therefore, in order to benefit from MAC CE(s) placed at the end of a MAC PDU with interleaved MAC sub-header(s), a new method is needed to indicate the starting point of the MAC CE(s) within the MAC PDU.

For the convenience for the description, in the following description, the present invention is described using an example where a UE is a transmitting side and a BS or network is a receiving side, but the present invention is also applied in the same or similar manner even when a BS or network is a transmitting side and a UE is a receiving side, except that a UE should receive a UL grant used for MAC PDU transmission while a BS does not have to receive a DL grant used for MAC PDU transmission but can allocate it for itself.

As a solution for the above-mentioned problems, the present invention proposes that a MAC PDU include a MAC CE start indicator indicating where the first MAC CE (i.e. the leftmost MAC CE) starts in the MAC PDU. In an example of the present invention, the MAC CE start indicator may be an indicator, i.e., MAC Control Elements Length Indicator (MAC CE LI), indicating a total length of MAC Control Elements (CEs) included in the MAC PDU, as described in Example 1 below. In an alternative example of the present invention, the MAC CE start indicator may be an indicator, i.e., MAC CE pointer, indicating a starting point of the first MAC CE included in the MAC PDU, as described in Example 2 below. In other words, the MAC CE start indicator of the present invention may be implemented with a MAC CE LI or MAC CE pointer.

As another solution which can be applied alone, or applied together with the MAC CE start indicator, the present invention proposes attaching a MAC subheader at the end of a corresponding MAC SDU or MAC CE. In this solution, a MAC at a receiving side can process the MAC PDU from the end of the MAC PDU to obtain MAC CE(s) and then process the remaining part of the MAC PDU to obtain MAC SDU(s).

Figure 10:
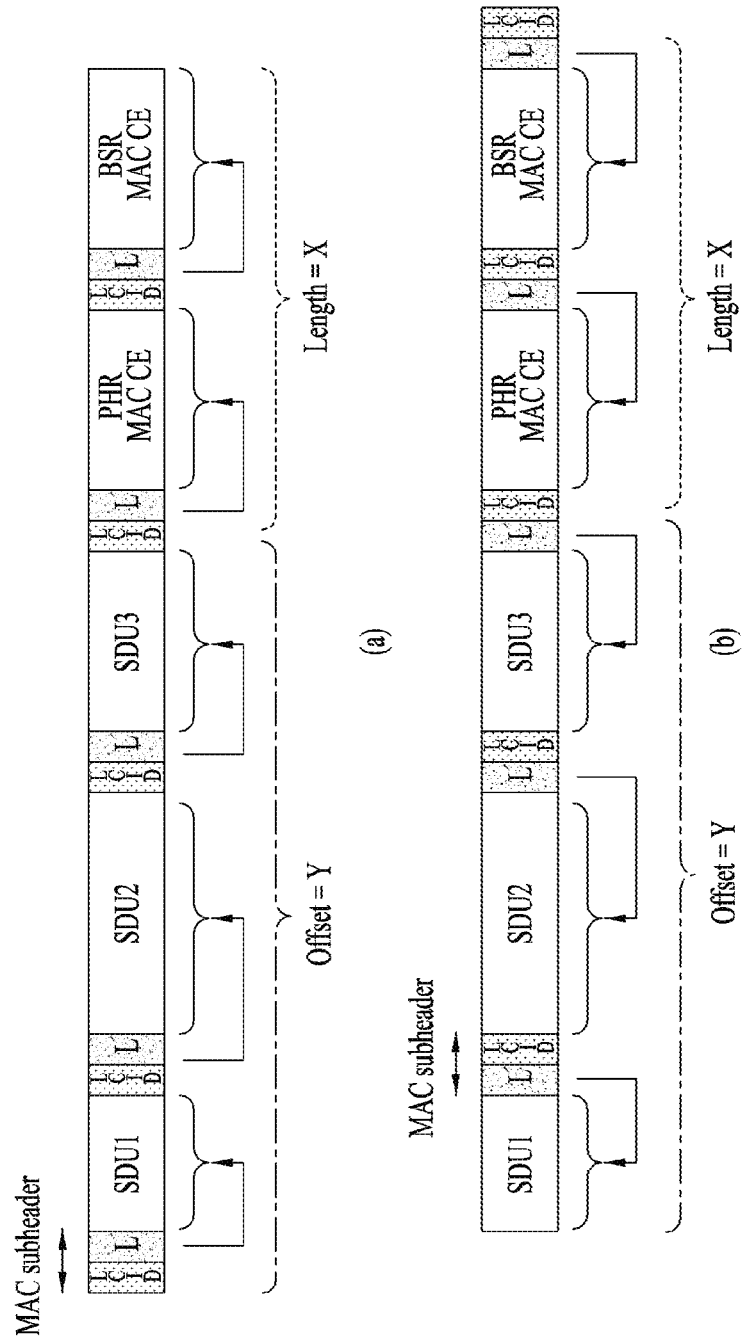
FIG. 10 illustrates examples for a MAC CE start indicator included in a MAC PDU according to the present invention.

FIG. 10 illustrates examples for a MAC CE start indicator included in a MAC PDU according to the present invention.

Referring to FIG. 10. the MAC CE start indicator, which is notated with "X" in FIG. 10, at the start or end of a MAC PDU may indicate a total length of MAC CEs included in the MAC PDU. The MAC CE start indicator, which is notated with "Y" in FIG. 10, at the start or end of a MAC PDU may indicate a starting point of the first MAC CE included in the MAC PDU.

FIG. 10(*a*) and FIG. 10(*b*) are different in that each MAC subheader of FIG. 10(*a*) exists immediately before a corresponding MAC SDU or MAC CE whereas each MAC subheader of FIG. 10(*b*) exists immediately after a corresponding MAC SDU or MAC CE. The present invention can be applied to a MAC PDU with interleaved MAC subheader(s), each of which is placed before a corresponding MAC SDU or MAC CE, and a MAC PDU with interleaved MAC subheader(s), each of which is placed after a corresponding MAC SDU or MAC CE.

Example 1

MAC CEs Length Indicator (MAC CE LI)

When a UE generates a MAC PDU, the UE includes a MAC CE LI indicating a total length of MAC CE(s) in the MAC PDU. The total length of MAC CE(s) is calculated as the sum of the length of all MAC CEs and the length of all MAC subheaders corresponding to each of the MAC CEs, which are included in the MAC PDU. In the present invention, a UE may generate a MAC PDU as follows.

A UE receives an uplink grant from a network. The UE determines, e.g., as a result of logical channel prioritization procedure, that zero or more MAC SDUs and/or zero or more MAC CEs are to be included in a MAC PDU which is to be transmitted by using the uplink grant. The UE generates a MAC subheader corresponding to each of MAC SDUs and/or MAC CEs. The UE generates a MAC CE LI indicating the total length of MAC CEs included in the MAC PDU as follows. The UE calculates the total length of MAC CEs as a sum of length of all MAC CEs and length of all MAC subheaders corresponding to MAC CEs included in the MAC PDU. The UE doesn't not count the length of any MAC SDU or the length of any MAC subheader corresponding to MAC SDU included in the MAC PDU. The UE may additionally count the length of padding bits and the length of MAC subheader corresponding to padding bits included in the MAC PDU. The UE sets a field of the MAC CE LI to the calculated total length of MAC CEs.

The MAC CE LI can be of fixed size, e.g., 1 byte. The MAC CE LI may be always included in the MAC PDU although there is no MAC CE included in the MAC PDU. The MAC CE LI may additionally indicate whether there is no MAC CE included in the MAC PDU or not, by including a field in the MAC CE LI. For example, the field is set to a value, e.g., 1, if there is at least one MAC CE in the MAC PDU. Otherwise, the field is set to, e.g., 0, if there is no MAC CE in the MAC PDU. If the field of the MAC CE LI indicates that there is no MAC CE included in the MAC PDU, the MAC CE LI may not include a field indicating the total length of MAC CE(s) included in the MAC PDU. In other words, if the field of the MAC CE LI indicates that there is no MAC CE included in the MAC PDU, a field indicating the total length of MAC CE included in the MAC PDU may be omitted in the MAC CE LI.

When the UE generates the MAC PDU including the MAC subheaders, the MAC SDUs, the MAC CEs, padding bits, and/or the MAC CE LI, the UE places the MAC CE LI as follows. The MAC CE LI is placed at the end of the MAC PDU, i.e., the rightmost position of the MAC PDU. For example, the MAC CE LI is placed after all MAC SDUs, all MAC CEs, padding bits, and all MAC subheaders corresponding to the MAC SDU/CE or padding bits. For another example, the MAC CE LI is placed after all MAC SDUs, all MAC CEs, and all MAC subheaders corresponding to MAC SDUs/CEs. Alternatively, the MAC CE LI is placed in the beginning of the MAC PDU, i.e., the leftmost position of the MAC PDU. For example, the MAC CE LI is placed before any MAC SDU, any MAC CE, any padding bits, and any MAC subheader corresponding to the MAC SDU/CE or padding bits.

Figure 11:
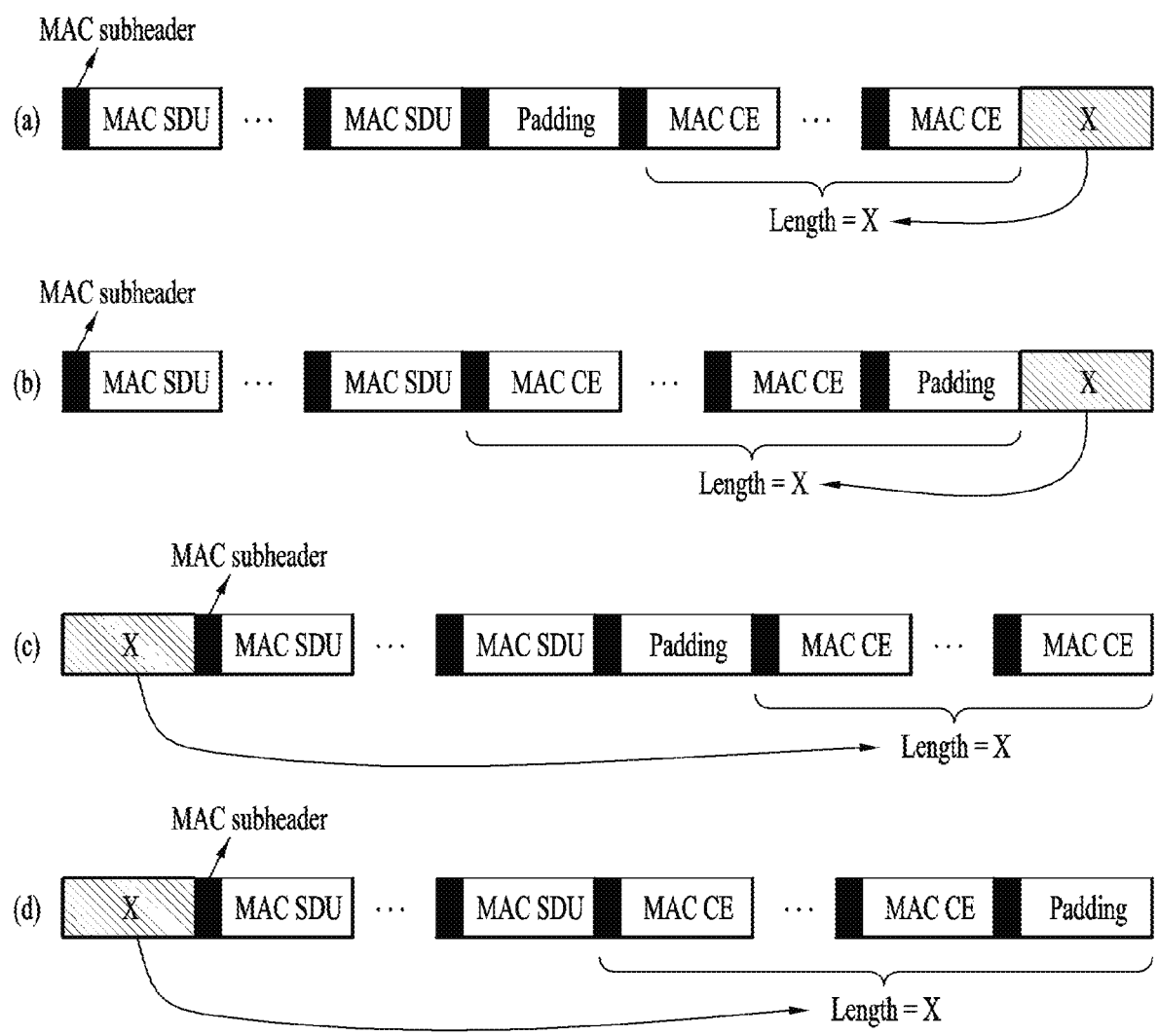
FIG. 11 and FIG. 12 illustrate examples for the order of MAC subheader(s), MAC SDU(s), MAC CE(s), padding bit(s) and/or MAC CE LI in a MAC PDU according to the present invention.
Figure 12:
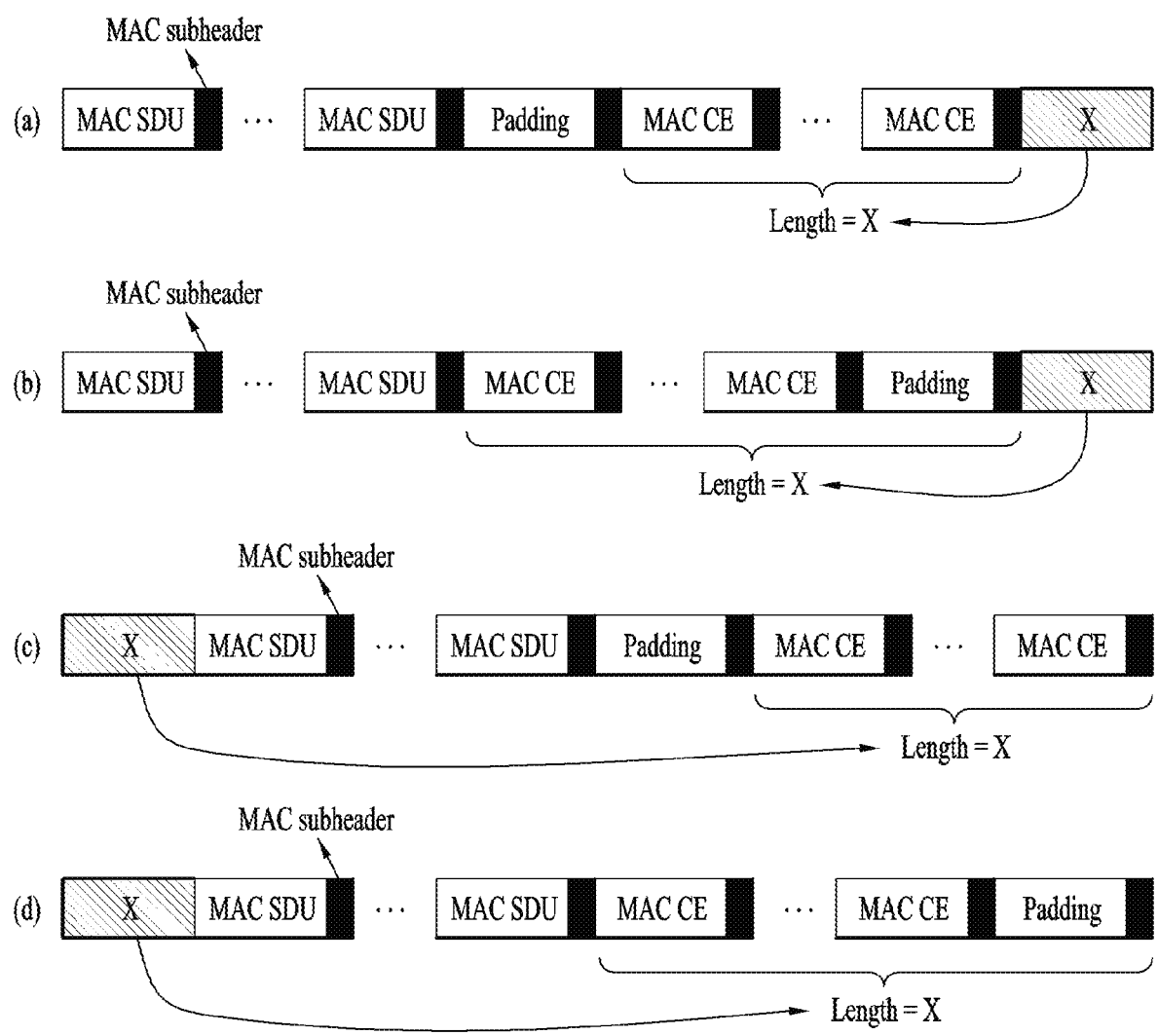

FIG. 11 and FIG. 12 illustrate examples for the order of MAC subheader(s), MAC SDU(s), MAC CE(s), padding bit(s) and/or MAC CE LI in a MAC PDU according to the present invention. FIG. 11 illustrates examples for MAC payload placement order for a MAC PDU with interleaved MAC subheader(s), each of which is placed before a corresponding MAC SDU or MAC CE. FIG. 12 illustrates examples for MAC payload placement order for a MAC PDU with interleaved MAC subheader(s), each of which is placed after a corresponding MAC SDU or MAC CE. FIG. 12(a), FIG. 12(b), FIG. 12(c) and FIG. 12(d) are substantially the same as FIG. 11(a), FIG. 11(b), FIG. 11(c) and FIG. 11(d), except for the location of MAC subheaders.

MAC subheader(s), MAC SDU(s), MAC CE(s), padding bit(s), and/or MAC CE LI may be placed within a MAC PDU, in the order illustrated in FIG. 11(a), FIG. 11(b), FIG. 11(c), or FIG. 11(d). In FIG. 11, a MAC PDU has each MAC subheader immediately before a corresponding MAC SDU, MAC CE or padding.

Referring to FIG. 11(a), a MAC PDU may include MAC payload in the following order: 'MAC subheader+MAC SDU', 'MAC subheader+padding bits' and/or 'MAC subheader+MAC CE', and 'MAC CE LI'. In the payload placement order illustrated in FIG. 11(a), a total length of MAC CEs is calculated as a sum of length of all MAC CEs and all MAC subheaders for the MAC CEs.

Referring to FIG. 11(b), a MAC PDU may include MAC payload in the following order: 'MAC subheader+MAC SDU', 'MAC subheader+MAC CE' and/or 'MAC subheader+padding bits', and MAC CE LI. In the payload placement order illustrated in FIG. 11(b), a total length of MAC CEs is calculated as a sum of length of all MAC CEs, padding bits, and all MAC subheaders for the MAC CEs and padding.

Referring to FIG. 11(c), a MAC PDU may include MAC payload in the following order: MAC CE LI and, 'MAC subheader+MAC SDU', 'MAC subheader+padding bits', and/or 'MAC subheader+MAC CE'. In the payload placement order illustrated in FIG. 11(c), a total length of MAC CEs is calculated as a sum of length of all MAC CEs and all MAC subheaders for the MAC CEs.

Referring to FIG. 11(d), a MAC PDU may include MAC payload in the following order: MAC CE LI and, 'MAC subheader+MAC SDU', 'MAC subheader+padding bits', and/or 'MAC subheader+MAC CE'. In the payload placement order illustrated in FIG. 11(d), a total length of MAC CEs is calculated as a sum of length of all MAC CEs, padding bits, and all MAC subheaders for the MAC CEs and padding.

MAC subheader(s), MAC SDU(s), MAC CE(s), padding bit(s), and/or MAC CE LI can be placed within a MAC PDU, in the order illustrated in FIG. 12(a), FIG. 12(b), FIG. 12(c), or FIG. 12(d). In FIG. 12, a MAC PDU has each MAC subheader immediately after a corresponding MAC SDU, MAC CE or padding.

Referring to FIG. 12(a), a MAC PDU may include MAC payload in the following order: 'MAC SDU+MAC subheader', 'padding bits+MAC subheader' and/or 'MAC CE+MAC subheader', and 'MAC CE LI'. In the payload placement order illustrated in FIG. 12(a), a total length of MAC CEs is calculated as a sum of length of all MAC CEs and all MAC subheaders for the MAC CEs.

Referring to FIG. 12(b), a MAC PDU may include MAC payload in the following order: 'MAC SDU+MAC subheader', 'MAC CE+MAC subheader' and/or 'padding bits+MAC subheader', and MAC CE LI. In the payload placement order illustrated in FIG. 12(b), a total length of MAC CEs is calculated as a sum of length of all MAC CEs, padding bits, and all MAC subheaders for the MAC CEs and padding.

Referring to FIG. 12(c), a MAC PDU may include MAC payload in the following order: MAC CE LI and, 'MAC SDU+MAC subheader', 'padding bits+MAC subheader', and/or 'MAC CE+MAC subheader'. In the payload placement order illustrated in FIG. 12(c), a total length of MAC CEs is calculated as a sum of length of all MAC CEs and all MAC subheaders for the MAC CEs.

Referring to FIG. 12(d), a MAC PDU may include MAC payload in the following order: MAC CE LI and, 'MAC SDU+MAC subheader', 'padding bits+MAC subheader', and/or 'MAC CE+MAC subheader'. In the payload placement order illustrated in FIG. 12(d), a total length of MAC CEs is calculated as a sum of length of all MAC CEs, padding bits, and all MAC subheaders for the MAC CEs and padding.

In the present invention, the MAC CE LI can be a MAC CE or MAC subheader. In other words, the MAC CE LI can be included in a MAC PDU in the form of a MAC CE or MAC subheader.

The MAC CE LI may not be identified by any MAC subheader. In other words, the payload for the MAC CE LI may not have any corresponding MAC subheader.

When the network receives the MAC PDU including the MAC CE LI, the network finds the location of MAC CEs in the MAC PDU by counting the total length of MAC CEs from the end of the MAC PDU. For example, if the MAC CE LI is placed at the end of the MAC PDU, the UE considers that MAC CEs are placed in the MAC PDU with the length indicated by the MAC CE LI from the end point of the MAC PDU except for the MAC CE LI. In other words, the network considers that MAC CEs are included in the MAC PDU with an offset which is equal to whole MAC PDU size minus total length of MAC CEs from the beginning of the MAC PDU. After the network finds the location of MAC CEs, i.e., the network finds where the MAC CEs are placed in the MAC PDU, the network may process the MAC CEs prior to processing MAC SDU(s) even though the MAC CEs are placed after the MAC SDU(s).

Example 2

MAC CE Pointer

When a UE generates a MAC PDU, the UE includes a MAC CE Pointer indicating an offset value between the beginning point of the MAC PDU and the starting point of the first MAC CE in the MAC PDU. If the MAC CE Pointer is placed in the beginning of the MAC PDU, the MAC CE Pointer indicating the offset value between the beginning point of the MAC PDU except for the MAC CE Pointer and the starting point of the first MAC CE in the MAC PDU. In the present invention, a UE may generate a MAC PDU as follows.

A UE receives an uplink grant from a network. The UE determines, e.g., as a result of a logical channel prioritization procedure, that zero or more MAC SDUs and/or zero or more MAC CEs are to be included in a MAC PDU which is to be transmitted by using the uplink grant. The UE generates a MAC subheader corresponding to each of MAC SDUs and/or MAC CEs. The UE generates a MAC CE Pointer indicating the offset value as follows. The UE calculates the offset value as a sum of length of all MAC SDUs and length of all MAC subheaders corresponding to MAC SDUs included in the MAC PDU. The UE doesn't not count the length of any MAC CE or the length of any MAC subheader corresponding to MAC CE included in the MAC PDU. The UE may additionally count the length of padding bits and the length of MAC subheader corresponding to padding bits included in the MAC PDU. The UE sets a field of the MAC CE Pointer to the calculated offset value.

The MAC CE Pointer can be of fixed size, e.g., 1 byte;

The MAC CE Pointer may be always included in the MAC PDU although there is no MAC CE included in the MAC PDU. The MAC CE Pointer may additionally indicate whether there is no MAC CE included in the MAC PDU or not, by including a field in the MAC CE Pointer. For example, the field is set to a value, e.g., 1, if there is at least one MAC CE in the MAC PDU. Otherwise, the field is set to, e.g., 0, if there is no MAC CE in the MAC PDU. If the field of the MAC CE Pointer indicates that there is no MAC CE included in the MAC PDU, the MAC CE Pointer may not include a field indicating the offset value included in the MAC PDU. In other words, if the field of the MAC CE Pointer indicates that there is no MAC CE included in the MAC PDU, a field indicating the offset value may be omitted in the MAC CE Pointer.

When the UE generates the MAC PDU including the MAC subheaders, the MAC SDUs, the MAC CEs, padding bits, and/or the MAC CE Pointer, the UE places the MAC CE Pointer as follows. The MAC CE Pointer is placed in the beginning of the MAC PDU, i.e., the leftmost position of the MAC PDU. For example, the MAC CE Pointer is placed before any MAC SDU, any MAC CE, any padding bits, and any MAC subheader corresponding to the MAC SDU/CE or padding bits. Alternatively, the MAC CE Pointer is placed at the end of the MAC PDU, i.e., the rightmost position of the MAC PDU. For example, the MAC CE Pointer is placed after all MAC SDUs, all MAC CEs, padding bits, and all MAC subheaders corresponding to the MAC SDUs/CEs or padding bits. For another example, the MAC CE Pointer is placed after all MAC SDUs, all MAC CEs, and all MAC subheaders corresponding to the MAC SDUs/CEs.

Figure 13:
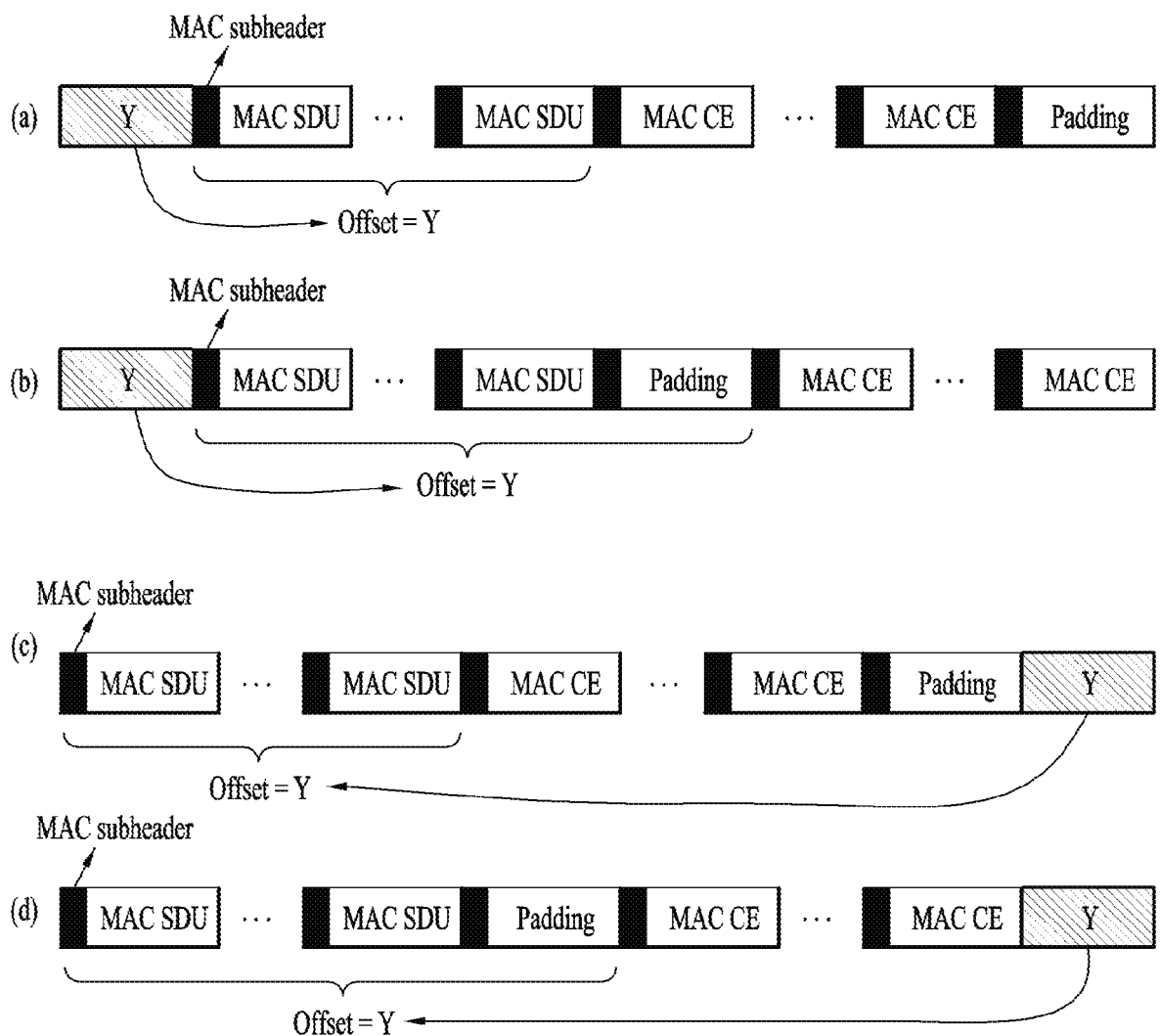
FIG. 13 illustrates examples for the order of MAC subheader(s), MAC SDU(s), MAC CE(s), padding bit(s) and/or MAC CE Pointer in a MAC PDU according to the present invention.

FIG. 13 illustrates examples for the order of MAC subheader(s), MAC SDU(s), MAC CE(s), padding bit(s) and/or MAC CE Pointer in a MAC PDU according to the present invention.

MAC subheader(s), MAC SDU(s), MAC CE(s), padding bit(s), and/or MAC CE Pointer may be placed within a MAC PDU, in the order illustrated in FIG. 13(a), FIG. 13(b), FIG. 13(c), or FIG. 13(d). Although FIG. 13 shows examples for a MAC PDU having each MAC subheader immediately before a corresponding MAC SDU, MAC CE or padding, the same payload placement order is applied to a MAC PDU having each MAC subheader immediately after a corresponding MAC SDU, MAC CE or padding, except for the location of MAC subheaders.

Referring to FIG. 13(a), a MAC PDU may include MAC payload in the following order: MAC CE Pointer and, 'MAC subheader+MAC SDU', 'MAC subheader+MAC CE' and/or 'MAC subheader+padding bits'. In the payload placement order illustrated in FIG. 13(a), the offset value is calculated as a sum of length of all MAC SDUs and all MAC subheaders for MAC SDUs.

Referring to FIG. 13(b), a MAC PDU may include MAC payload in the following order: MAC CE Pointer and, 'MAC subheader+MAC SDU', 'MAC subheader+padding bits', 'MAC subheader+MAC CE'. In the payload placement order illustrated in FIG. 13(b), a MAC CE Pointer is calculated as a sum of length of all MAC SDUs, length of padding bits, and all MAC subheaders for the MAC SDUs and padding.

Referring to FIG. 13(c), a MAC PDU may include MAC payload in the following order: 'MAC subheader+MAC SDU', 'MAC subheader+padding bits' and/or 'MAC subheader+MAC CE', and MAC CE Pointer. In the payload placement order illustrated in FIG. 13(c), the offset value is calculated as a sum of length of all MAC SDUs and all MAC subheaders for the MAC SDUs.

Referring to FIG. 13(d), a MAC PDU may include MAC payload in the following order: 'MAC subheader/MAC SDU', 'MAC subheader/MAC CE' and/or 'MAC subheader+padding bits', and MAC CE Pointer. orIn the payload placement order illustrated in FIG. 13(d), the offset value is calculated as a sum of length of all MAC SDUs, padding bits, and all MAC subheaders for the MAC SDUs and padding.

The MAC CE Pointer can be a MAC CE or a MAC subheader. In other words, the MAC CE Pointer can be included in a MAC PDU in the form of a MAC CE or MAC subheader.

The MAC CE Pointer may not be identified by any MAC subheader. In other words, the payload for the MAC CE LI may not have any corresponding MAC subheader.

When the network receives the MAC PDU including the MAC CE Pointer, the network finds the location of MAC CEs in the MAC PDU by counting the offset value from the beginning of the MAC PDU. For example, if MAC CE Pointer is placed in the beginning of the MAC PDU, the UE considers that MAC CEs are placed in the MAC PDU with an offset value indicated by the MAC CE Pointer from the beginning point of the MAC PDU except for the MAC CE Pointer. After the network finds the location of MAC CEs, i.e., the network finds where the MAC CEs are placed in the MAC PDU, the network may process the MAC CEs prior to processing MAC SDU(s) even though the MAC CEs are placed after the MAC SDU(s).

As mentioned before, the present invention has following benefits. The transmitting side (e.g. UE) can process MAC SDUs for transmission without waiting for the MAC CE construction, and this will facilitate the fast MAC PDU processing in the transmitting side. A receiving side (e.g. BS) can easily identify a MAC CE by processing a MAC PDU based on the MAC CE start indicator, and this will facilitate the fast MAC CE processing in the receiving side.

The present invention also applies to DL data transmission where the transmitting side is a BS and the receiving side is a UE.

Figure 14:
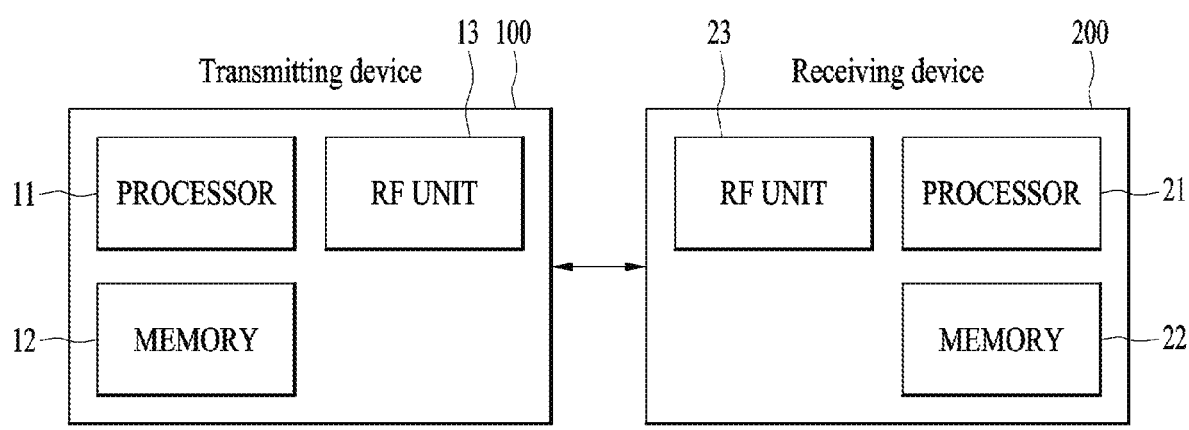
FIG. 14 is a block diagram illustrating elements of a transmitting device 100 and a receiving device 200 for implementing the present invention.

FIG. 14 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The UE processor can be configured to operate according to the present invention, or control the UE RF unit to receive or transmit signals according to the present invention. The eNB processor can be configured to operate according to the present invention, or control the eNB RF unit to receive or transmit signals according to the present invention.

A processor of a transmitting device generates a MAC PDU according to present invention, and the processor of the transmitting device controls the RF unit to transmit the MAC PDU. The processor of the transmitting device may generate the MAC PDU such that the MAC PDU includes a MAC CE start indicator according to the present invention, where the MAC CE start indicator indicates the start point of the first MAC CE in the MAC PDU. The processor of the transmitting device may generate the MAC PDU such that the MAC PDU always includes the MAC CE start indicator even if there is no MAC CE included in the MAC PDU. The MAC PDU may include zero or more MAC SDUs and zero or more MAC CEs. The MAC CE start indicator may indicate the start point by indicating a sum of a total length of the MAC CEs included in the MAC PDU and a total length of respective MAC subheaders for the MAC CEs included in the MAC PDU. The MAC CE start indicator may indicate the start point by indicating a sum of a total length of the MAC CEs included in the MAC PDU, a total length of respective MAC subheaders for the MAC CEs included in the MAC PDU, a length of padding bits included in the MAC PDU, and a length of a MAC subheader for the padding bits included in the MAC PDU. The MAC CE start indicator may indicate wherein the MAC CE start indicator indicates the start point by indicating a sum of a total length of the MAC SDUs included in the MAC PDU and a total length of respective MAC subheaders for the MAC SDUs included in the MAC PDU. The MAC CE start indicator may indicate the start point by indicating a sum of a total length of the MAC SDUs included in the MAC PDU, a total length of respective MAC subheaders for the MAC SDUs included in the MAC PDU, a length of padding bits included in the MAC PDU, and a length of a MAC subheader for the padding bits included in the MAC PDU. The processor of the transmitting device may generate the MAC PDU such that the zero or more MAC SDUs are placed before the zero or more MAC CEs in the MAC PDU. The processor of the transmitting device may generate the MAC PDU such that the MAC CE start indicator is placed in the beginning or end of the MAC PDU. The MAC PDU may include no MAC subheader for the MAC CE start indicator. If the transmitting device is a UE, the processor of the transmitting device generates the MAC PDU based on a UL grant received from a receiving side (e.g. BS), and controls the RF unit of the transmitting device to transmit the MAC PDU using the UL grant. If the transmitting device is a BS, the processor of the transmitting device may control the RF unit of the transmitting device to transmit a DL grant and control the RF unit of the transmitting device to transmit the MAC PDU using the DL grant.

A processor of a receiving device controls a RF unit of the receiving device to receive the MAC PDU, and process the MAC PDU according to the present invention. The processor of the receiving device may find the location of MAC CE(s) included in the MAC PDU based on the MAC CE start indicator. If the MAC CE start indicator is a MAC CE LI of the present invention, the processor of the receiving device may find the location of the MAC CE(s) in the MAC PDU by counting the total length of the MAC CEs (and padding bits) from the end of the MAC PDU. If the MAC CE start indicator is a MAC CE Pointer of the present invention, the processor of the receiving device may find the location of MAC CE(s) in the MAC PDU by counting the offset value from the beginning of the MAC PDU. If the processor of the receiving device finds the location of MAC CE(s), i.e., the processor of the receiving device finds where the MAC CE(s) are placed in the MAC PDU, the processor of the receiving device may process the MAC CEs prior to processing MAC SDU(s) even though the MAC CEs are placed after the MAC SDU(s). The processor of the receiving device may process the MAC CE(s) from the start point based on the MAC CE start indicator. The processor of the receiving device may process the MAC PDU from the end of the MAC PDU toward the start of the MAC PDU. If the receiving device is a BS, the processor of the receiving device may transmit the RF unit of the receiving device to transmit a UL grant to a UE and control the RF unit of the receiving device to receive a MAC PDU using the UL grant. If the receiving device is a UE, the processor of the receiving device may control the RF unit of the receiving device to receive a DL grant and control the RF unit of the receiving device to a MAC PDU using the DL grant.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

What is claimed is:

1. A method for transmitting, by a transmitting device, a data unit in a wireless communication system, the method comprising:
    generating, by the transmitting device, a medium access control (MAC) protocol data unit (PDU); and
    transmitting, by the transmitting device, the MAC PDU,
    wherein the MAC PDU includes a plurality of consecutive MAC sub units,
    wherein the plurality of consecutive MAC sub units includes i) zero or more consecutive first MAC sub units, each consisting of a MAC subheader for a MAC service data unit (SDU) and the MAC SDU consecutive to the MAC subheader for the MAC SDU, ii) one or more consecutive second MAC sub units, each consisting of a MAC subheader for a MAC control element (CE) and the MAC CE consecutive to the MAC subheader for the MAC CE, and iii) zero or one third MAC sub unit consisting a MAC subheader for padding and the padding consecutive to the MAC subheader for the padding, and
    wherein the MAC PDU includes a MAC CE start indicator regarding where a MAC sub unit containing a MAC CE closest to a beginning of the MAC PDU among the one or more consecutive second MAC sub units starts in the MAC PDU.

2. The method according to claim 1, wherein the MAC CE start indicator indicates a sum of a total length of the MAC CEs included in the MAC PDU and a total length of respective MAC subheaders for the MAC CEs included in the MAC PDU.

3. The method according to claim 1, wherein the MAC CE start indicator indicates a sum of a total length of the MAC CEs included in the MAC PDU, a total length of respective MAC subheaders for the MAC CEs included in the MAC PDU, a length of padding bits included in the MAC PDU, and a length of a MAC subheader for the padding bits included in the MAC PDU.

4. The method according to claim 1, wherein the MAC CE start indicator indicates a sum of a total length of the MAC SDUs included in the MAC PDU and a total length of respective MAC subheaders for the MAC SDUs included in the MAC PDU.

5. The method according to claim 1, wherein the MAC CE start indicator indicates a sum of a total length of the MAC SDUs included in the MAC PDU, a total length of respective MAC subheaders for the MAC SDUs included in the MAC PDU, a length of padding bits included in the MAC PDU, and a length of a MAC subheader for the padding bits included in the MAC PDU.

6. The method according to claim 1, wherein the zero or more consecutive first MAC sub units are placed before the one or more consecutive second MAC sub units in the MAC PDU.

7. The method according to claim 1, wherein the MAC CE start indicator is placed in the beginning of the MAC PDU.

8. The method according to claim 1, wherein the MAC PDU includes no MAC subheader for the MAC CE start indicator.

9. The method according to claim 1, wherein the MAC CE start indicator is placed in an end of the MAC PDU.

10. A transmitting device for transmitting a data unit in a wireless communication system, the transmitting device comprising:
a radio frequency (RF) transceiver, and
a processor; and
a memory storing at least one program that causes the processor to perform operations comprising:
generating a medium access control (MAC) protocol data unit (PDU); and
transmitting, via the RF transceiver, the MAC PDU,
wherein the MAC PDU includes a plurality of consecutive MAC sub units,
wherein the plurality of consecutive first MAC sub units includes i) zero or more consecutive MAC sub units consecutive to the MAC subheader for the MAC SDU, each consisting of a MAC subheader for a MAC service data unit (SDU) and the MAC SDU, ii) one or more consecutive second MAC sub units, each consisting of a MAC subheader for a MAC control element (CE) and the MAC CE consecutive to the MAC subheader for the MAC CE, and iii) zero or one third MAC sub unit consisting a MAC subheader for padding and the padding consecutive to the MAC subheader for the padding, and
wherein the MAC PDU includes a MAC CE start indicator regarding where a MAC sub unit containing a MAC CE closest to a beginning of the MAC PDU among the one or more of consecutive second MAC sub units starts in the MAC PDU.

11. The transmitting device according to claim 10, wherein the MAC CE start indicator indicates a sum of a total length of the MAC CEs included in the MAC PDU and a total length of respective MAC subheaders for the MAC CEs included in the MAC PDU.

12. The transmitting device according to claim 10, wherein the MAC CE start indicator indicates a sum of a total length of the MAC CEs included in the MAC PDU, a total length of respective MAC subheaders for the MAC CEs included in the MAC PDU, a length of padding bits included in the MAC PDU, and a length of a MAC subheader for the padding bits included in the MAC PDU.

13. The transmitting device according to claim 10, wherein the MAC CE start indicator indicates a sum of a total length of the MAC SDUs included in the MAC PDU and a total length of respective MAC subheaders for the MAC SDUs included in the MAC PDU.

14. The transmitting device according to claim 10, wherein the MAC CE start indicator indicates a sum of a total length of the MAC SDUs included in the MAC PDU, a total length of respective MAC subheaders for the MAC SDUs included in the MAC PDU, a length of padding bits included in the MAC PDU, and a length of a MAC subheader for the padding bits included in the MAC PDU.

15. The transmitting device according to claim 10, wherein the zero or more consecutive first MAC sub units are placed before the one or more consecutive second MAC sub units in the MAC PDU.

16. The transmitting device according to claim 10, wherein the MAC PDU includes no MAC subheader for the MAC CE start indicator.

17. The transmitting device according to claim 10, wherein the MAC CE start indicator is placed in the beginning of the MAC PDU.

18. The transmitting device according to claim 10, wherein the MAC CE start indicator is placed in an end of the MAC PDU.

* * * * *